2,809,973
Patented Oct. 15, 1957

2,809,973

SODIUM 3-(2-BENZOTHIAZOLYLMERCAPTO)-1-PROPANE SULFONATE

Van R. Gaertner, Dayton, Ohio, assignor to Monsanto Chemical Company, St. Louis, Mo., a corporation of Delaware No Drawing. Application November 12, 1954, Serial No. 468,545

1 Claim. (Cl. 260—306)

The present invention relates to mercaptobenzothiazole derivatives and more particularly provides a new and valuable class of heterocyclic sulfonic acid compounds.

I have found that mercaptobenzothiazole or salts thereof react with sultones when contacted therewith in an alkaline medium to give sulfonic acid compounds substantially according to the scheme:

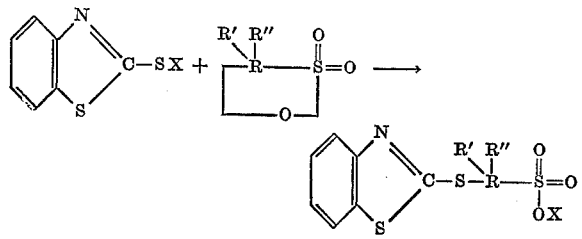

in which X is selected from the class consisting of hydrogen, alkali metal, alkaline earth metal and ammonium and R is a bivalent hydrocarbon radical free of non-benzenoid unsaturation and containing from 3 to 7 carbon atoms and R' and R'' are selected from the class consisting of hydrogen and hydrocarbon radicals free of non-benzenoid unsaturation, and containing from 1 to 12 carbon atoms.

Sultones employed for the production of the present sulfonates are readily available materials which are obtained by a variety of processes. One method employs treatment of an olefinic alcohol such as allyl alcohol with an alkali metal bisulfite such as sodium bisulfite in the presence of air to give a hydroxyalkanesulfonate and hydrolysis of the latter to the free sulfonic acid and ring-closure of the acid, e. g., by heating to give the alkane-sultone. Another method involves sulfochlorination of an organic halide to give a halogensubstituted organic sulfonyl chloride, hydrolysis of the acyl halide, and ring-closure of the hydrolysis product with hydrogen chloride evolution to give the sultone. Because sulfochlorination of halogenated alkanes does not always result in introduction of the sulfonyl radical at the same carbon atom, mixtures of (chloroalkane) sulfonic acids are generally formed. Conversion of the mixture of acids to the corresponding sulfonyl chlorides and ring-closure of the latter leads to the formation of a mixture of alkanesultones. The nature of the sultone varies, of course, with the position of the halogen in the halogenated alkane which is employed in the sulfochlorination. When the halogenated alkanes are prepared by reaction of an alkane or a technical mixture of alkanes such as kerosene, substitution of the halogen also does not result at the same carbon atom. Hence technically available sultones, especially those prepared from the higher alkanes, are generally mixtures of isomeric sultones. For practical purposes, sultones derived via the sulfochlorination of halogenated alkanes are usually referred to simply as the sultones of, say, butane, pentane, isooctane, n-decane, tert-dodecane, n-hexadecane, n-octadecane, etc., without denoting the point of attachment of the sultone structure at the alkane chain.

Sultones are commonly regarded as ring-closure products of hydroxy-substituted alkanesulfonic acids and are similar in structure to lactones, obtainable by ring-closure of hydroxyalkanecarboxylic acids. Hence a commonly employed system of nomenclature for the sultones recites the hydroxyalkanesulfonic acid from which the sultone is derived. Thus, one sultone which is useful for the present purpose is the sultone of 3-hydroxypropanesulfonic acid

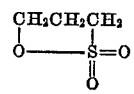

The above sultone is available from allyl alcohol by the above described bisulfite process or from propyl chloride by the sulfochlorination process. Sultones which are useful in the present invention for reaction with the mercaptobenzothiazole are, for example, the sultone of 4-hydroxy-1-butanesulfonic acid, the sultone of 3-hydroxy-1-propanesulfonic acid, the sultone of 4-hydroxy-2-methyl-2-butanesulfonic acid, the sultone of 5-hydroxy-1-pentanesulfonic acid, the sultone of 5-hydroxy-2-pentanesulfonic acid, the sultone of 4-hydroxy-2-pentanesulfonic acid, the sultone of 4-hydroxy-2-methyl-2-pentanesulfonic acid, the sultone of o-(hydroxymethyl)benzenesulfonic acid, the sultone of 3-hydroxy-2-methyl-3-phenyl-1-propanesulfonic acid, the sultone of 2,4-diphenyl-4-hydroxy-1-butanesulfonic acid, the sultone of 2-hydroxy-2-phenyl-1-ethanesulfonic acid, and the sultone of 2-hydroxy-1-cyclohexanesulfonic acid.

A class of particularly valuable benzothiazolylmercapto-substituted sulfonic acid compounds provided by the present invention comprises (2-benzothiazolylmercapto)alkanesulfonic acid compounds wherein the alkane radical has from 3 to 18 carbon atoms. Examples of this class are sodium 3-(2-benzothiazolylmercapto)-1-propanesulfonate, 4 - (2 - benzothiazolylmercapto)-1-butanesulfonic acid, potassium 4 - (2-benzothiazolylmercapto)-2-butanesulfonate, sodium 4-(2-benzothiazolylmercapto)-2-methyl-2-butanesulfonate, lithium 5 - (2-benzothiazolylmercapto) - 1 - pentanesulfonate, 4-(2-benzothiazolylmercapto) - 2 - pentanesulfonic acid, ammonium 4 - (2 - benzothiazolylmercapto) - 2 - methyl-2-pentanesulfonate and sulfonic acids derived from higher alkanesultones wherein the position of the sultone grouping at the alkane chain is not known, e. g., sodium (2-benzothiazolylmercapto)octanesulfonate, potassium (2-benzothiazolylmercapto)dodecanesulfonate, ammonium (2-benzothiazolylmercapto)tetradecanesulfonate, sodium (2-benzothiazolylmercapto)octadecanesulfonate, etc.

Examples of benzothiazolylmercapto-substituted aromatic or cycloaliphatic sulfonic acid compounds provided by the present invention are sodium 3-(2-benzothiazolylmercapto)-2-methyl-3-phenyl-1-propanesulfonate, 4 - (2-benzothiazolylmercapto) - 2,4 - diphenyl-1-butanesulfonic acid, calcium 2 - (2-benzothiazolylmercapto)-2-phenyl-1-ethanesulfonate, sodium 2-(2-benzothiazolylmercapto)-1-cyclohexanesulfonate, potassium o-[(2-benzothiazolylmercapto)methyl]benzenesulfonate, etc.

In preparing the present (2-benzothiazolylmercapto) alkanesulfonates, I may contact the sultone with the mercaptobenzothiazole in alkaline medium, or I may contact the sultone with a preformed salt of the mercaptobenzothiazole, e. g., an alkali metal salt. Examples of alkaline materials useful for the present purpose are ammonium hydroxide, the alkali metal or the alkaline earth metal oxides or hydroxides, and basic reacting salts thereof such as the sodium, potassium, calcium, barium or lithium oxides, hydroxides, carbonates, bicarbonates, and acetates. The alkali metal alcoholates or phenoxides are convenient basic materials for the present purpose in that their use permits operation in organic solvents or diluents, e. g., ethanol, isopropanol, or phenol, from which the present sulfonates are readily separated. Alkali metal alcoholates or phenoxides which are preferred are: sodium, potassium or lithium methoxides, propoxides, butoxides, or phenoxides.

While condensation of the sultone and the mercaptobenzothiazole may be effected either in the presence or absence of an inert solvent or diluent, operation is smoother and manipulation of the reactants is facilitated when a solvent or diluent is used. When working with an inorganic alkali, water, or a mixture of water and an inert solvent or diluent, is preferably employed. Organic materials which may be used either as diluents with the inorganic alkaline agents or as solvents with the alkali alcoholates or phenoxides are, for example, lower boiling alcohols such as methanol, ethanol, isopropanol, or n-butanol; ketones, such as acetone or methyl ethyl ketone; ethers such as ethyl or isopropyl ether; hydrocarbons such as benzene, toluene, or hexane, etc. In some instances it is convenient to prepare the alcohol metal alcoholate or phenoxide in situ employing an excess of the hydroxy component as diluent. Thus the initial reaction mixture may consist of the sultone, the mercaptobenzothiazole, an alkali metal or an alkaline earth metal hydroxide, and an alcohol.

Reaction of the sultone with the mercaptobenzothiazole takes place readily at ordinary or increased temperatures. The sultone is simply contacted with the mercaptobenzothiazole in the presence of the alkaline agent and the resulting mixture is allowed to stand until formation of the sulfonate is complete. The alkaline agent is generally mixed with the thiol initially; however, the reaction may be effected by adding one of the reactants gradually to a mixture of either the thiol or the sultone and the alkaline agent. Because the reaction is generally exothermic, the latter course is usually more convenient, the rate of the addition being so regulated as to avoid too sudden a rise in temperature; in most instances the reaction is complete by the time all of the reactants have been contacted with each other; however, depending upon the nature of the individual sultone, it may be expedient to allow the reaction mixture to stand at least until it attains room-temperature. With the high molecular weight alkanesultones, e. g., n-octadecanesultone, moderate heating, say, heating of up to 100° C., may be required in order to obtain good yields of the sulfonate. Isolation of the sulfonate is effected by removing any unreacted material, e. g., by distillation, by extracting the sulfonate with water, etc. In most instances, however, when employing substantially equimolar quantities of thiol and sultone, no isolating procedures are required, the crude reaction mixture being applicable for direct use as surfactant.

The present benzothiazolylmercapto-substituted sulfonates are stable, generally water soluble, compounds which range from waxy to crystalline solids. While they are valuable for a variety of industrial and agricultural purposes, their utility depends to some extent on the nature of the sultones from which they are derived. Thus, while the (2-benzothiazolylmercapto)alkanesulfonates formed by the reaction of mercaptobenzothiazole with sultones obtained via sulfochlorination of halogenated higher alkanes, e. g., those in which the alkane radical has from 8 to 18 carbon atoms, possess good surface-active properties and are valuable as detersive, wetting-out and lathering agents, (2-mercaptobenzothiazolyl)alkanesulfonates in which the alkane radical has less than 8 carbon atoms are most advantageously employed as biological toxicants, particularly as fungicides and herbicides. Those of the sulfonates which are prepared by reaction of mercaptobenzothiazole and an aromatic or a cycloaliphatic sultone are useful as detersive lubricant additives and as rubber vulcanization accelerators.

The present invention is further illustrated, but not limited, by the following example:

*Example*

To a mixture consisting of 16.7 g. (0.10 mole) of mercaptobenzothiazole, 10 g. of a 40% aqueous solution of sodium hydroxide and 50 ml. of water, there was added portionwise during 30 minutes 12.2 g. (0.10 mole) of the sultone of 3-hydroxy-1-propanesulfonic acid. The exothermic reaction was maintained at about 40° C. by the gradual addition. When all of the sultone had been added, the whole was stirred for 20 minutes and additional 40% aqueous sodium hydroxide solution was added to bring the reaction mixture to a pH of about 10. The reaction mixture was then allowed to stand for 15 minutes at the end of which time it was made acid (to a pH of 2) by treating it with hydrochloric acid. It was then concentrated by heating it under vacuum at a temperature of 40° C. The resulting thick slurry was diluted with ethanol, filtered and the precipitate washed three times with the alcohol. Oven-drying of the washed precipitate gave 19.8 g. of sodium 3-(2-benzothiazolylmercapto)-1-propanesulfonate. Concentration of the combined filtrates and washings by heating at about 30° C. under vacuum to near-dryness and working up the resulting concentrate with ethanol gave an additional 5.6 g. of the sulfonate. The total quantity (25.4 g.) of the sulfonate thus obtained represented an 81.6% yield.

A pure product was obtained by dissolving 5.0 g. of the above sulfonate in 10 ml. of water, precipitating the salt with 200 ml. of acetone, redissolving the precipitate in 5 ml. of hot water, filtering the resulting solution while hot, adding 100 ml. of acetone to the filtrate, cooling the mixture of acetone and filtrate, filtering off the resulting precipitate, and drying it. The resulting pure sodium 3 - (2 - benzothiazolylmercapto) - 1 - propanesulfonate analyzed as follows:

| | Found | Calcd. for $C_{10}H_{10}NS_2O_3Na$ |
| --- | --- | --- |
| Percent C | 38.48 | 38.5 |
| Percent H | 3.70 | 3.28 |

What I claim is:

Sodium 3 - (2 - benzothiazolylmercapto) - 1 - propanesulfonate.

References Cited in the file of this patent

UNITED STATES PATENTS

| 2,098,759 | Reppe et al. | Nov. 9, 1937 |
| 2,483,416 | Jansen et al. | Oct. 4, 1949 |
| 2,617,807 | Sander | Nov. 11, 1952 |

OTHER REFERENCES

Helberger et al.: Chem. Abstracts, vol. 44, col. 1892 (1950).